United States Patent
Yoo

(10) Patent No.: US 9,798,937 B2
(45) Date of Patent: Oct. 24, 2017

(54) VEHICLE CONTROL METHOD FOR SAFETY DRIVING AND DEVICE THEREOF

(71) Applicant: HYUNDAI MOBIS CO., LTD., Seoul (KR)

(72) Inventor: Seong Jae Yoo, Yongin (KR)

(73) Assignee: HYUNDAI MOBIS CO., LTD, Seoul (KR)

(*) Notice: Subject to any disclaimer, the term of this patent is extended or adjusted under 35 U.S.C. 154(b) by 35 days.

(21) Appl. No.: 14/788,472

(22) Filed: Jun. 30, 2015

(65) Prior Publication Data

US 2016/0055384 A1 Feb. 25, 2016

(30) Foreign Application Priority Data

Aug. 20, 2014 (KR) ........................ 10-2014-0108447

(51) Int. Cl.
*G06F 17/00* (2006.01)
*G06G 7/78* (2006.01)
(Continued)

(52) U.S. Cl.
CPC ......... *G06K 9/00805* (2013.01); *B60W 30/08* (2013.01); *G06T 7/70* (2017.01);
(Continued)

(58) Field of Classification Search
CPC .... G08G 1/09626; G08G 1/164; G08G 1/161; G08G 1/166; G08G 1/165; G08G 1/167; G08G 1/16; G08G 1/20; G06T 2207/10048; G06T 2207/30252; G06T 2207/30261; G06T 3/4038; G06T 2207/10016; G06T 2207/10024; G06T 7/70; G06T 2207/20182; G06K 9/00798; G06K 2209/27; G06K 9/00255; G06K 9/00362; G06K 9/00664; G06K 9/3233; G06K 9/00892; G06K 9/00912; G06K 9/00671; G06K 7/10316; G06K 7/10326; G06K 7/10346; G06K 9/00744; G06K 9/6218
(Continued)

(56) References Cited

U.S. PATENT DOCUMENTS 5,268,575 A * 12/1993 Tajima .................. H04N 5/205
250/330
6,327,522 B1 * 12/2001 Kojima .................. B60K 35/00
348/115
(Continued)

FOREIGN PATENT DOCUMENTS

KR 10-2011-0008126 A 1/2011

*Primary Examiner* — Jelani Smith
*Assistant Examiner* — Luis A Martinez Borrero

(57) ABSTRACT

The present invention provides a vehicle control method for driving safety, including: a first step of photographing an infrared image and a visible ray image; a second step of transmitting the photographed infrared image and visible ray image to an image recognizing and comparing module; a third step of leaving only a frequency for an edge of the infrared image and the visible image using a high pass filter, in the image recognizing and comparing module; and a fourth step of comparing a frequency band distribution processed in the third step to determine the situation as a situation which has a difficulty to secure a clear view when a difference is equal to or higher than a predetermined level.

11 Claims, 4 Drawing Sheets

(51) Int. Cl.
  *G08G 1/16*   (2006.01)
  *G06K 9/00*   (2006.01)
  *B60W 30/08*  (2012.01)
  *G06T 7/70*   (2017.01)
(52) U.S. Cl.
  CPC .............. *G06T 2207/10048* (2013.01); *G06T 2207/30261* (2013.01)
(58) Field of Classification Search
  USPC ... 701/1, 25, 301, 36, 408, 41, 11, 112, 117, 701/28, 400, 70
  See application file for complete search history.

(56) References Cited

U.S. PATENT DOCUMENTS

| | | | | |
|---|---|---|---|---|
| 6,327,536 B1* | 12/2001 | Tsuji | ...................... | B60Q 9/008 340/435 |
| 6,625,310 B2* | 9/2003 | Lipton | ............... | G06K 9/00771 375/240.01 |
| 7,098,618 B2* | 8/2006 | Morishita | ............. | B60S 1/0818 318/440 |
| 7,151,439 B2* | 12/2006 | Moisel | ...................... | B60R 1/00 340/425.5 |
| 7,493,202 B2* | 2/2009 | Demro | ................ | B60R 21/0134 382/104 |
| 8,319,618 B2* | 11/2012 | Gomi | ........................ | B60R 1/00 340/435 |
| 8,436,902 B2* | 5/2013 | Kuehnle | ................ | G01W 1/14 348/142 |
| 8,750,572 B2* | 6/2014 | Gloger | ...................... | B60R 1/00 348/148 |
| 9,443,142 B2* | 9/2016 | Reynolds, Jr. | ..... | G06K 9/00624 |
| 2002/0183929 A1* | 12/2002 | Tsuji | ...................... | G08G 1/166 701/301 |
| 2004/0120014 A1* | 6/2004 | Nakajima | ................. | G06T 5/10 358/3.26 |
| 2006/0115119 A1* | 6/2006 | Nagaoka | ................. | B60Q 1/525 382/104 |
| 2007/0280504 A1* | 12/2007 | Badawy | ............. | G06K 9/00711 382/104 |
| 2008/0046150 A1* | 2/2008 | Breed | ................. | B60R 21/0134 701/45 |
| 2009/0092284 A1* | 4/2009 | Breed | ...................... | B60J 10/00 382/103 |
| 2010/0040285 A1* | 2/2010 | Csurka | ............... | G06K 9/00624 382/170 |
| 2010/0060169 A1* | 3/2010 | Sugimoto | ............ | B60Q 1/1423 315/82 |
| 2010/0134325 A1* | 6/2010 | Gomi | ........................ | B60R 1/00 340/995.14 |
| 2010/0265345 A1* | 10/2010 | Andersson | ................ | B60R 1/00 348/216.1 |
| 2012/0008866 A1* | 1/2012 | Halimeh | ............ | G06K 9/00791 382/190 |
| 2012/0044357 A1* | 2/2012 | Min | ........................ | G06T 5/008 348/164 |
| 2014/0078459 A1* | 3/2014 | Kim | ........................ | G02F 1/1333 349/193 |
| 2014/0270378 A1* | 9/2014 | Aimura | .............. | G06K 9/00805 382/103 |
| 2014/0285667 A1* | 9/2014 | Aimura | .................. | G08G 1/166 348/148 |
| 2015/0008823 A1* | 1/2015 | Lim | ........................ | B60Q 1/30 315/77 |
| 2015/0224987 A1* | 8/2015 | Tachibana | .............. | G08G 1/166 701/1 |
| 2016/0026880 A1* | 1/2016 | Lee | .................... | G06K 9/00798 382/103 |

* cited by examiner

VEHICLE CONTROL METHOD FOR SAFETY DRIVING AND DEVICE THEREOF

CROSS-REFERENCE TO RELATED APPLICATIONS

This application claims priority to and the benefit of Korean Patent Application No. 10-2014-0108447 filed in the Korean Intellectual Property Office on Aug. 20, 2014, the entire contents of which are incorporated herein by reference.

TECHNICAL FIELD

The present invention relates to a vehicle control method for driving safety which photographs a visible ray and an infrared ray at a high speed to recognize a situation which has a difficulty to secure a clear view and turns on a fog lamp, limits a speed, and drives to actively avoid an obstacle and a device thereof.

BACKGROUND ART

Generally, when a visibility on a road is short to be 1 m due to heavy fog, the foggy situation threatens driving safety of a vehicle. When a driver drives a car in a situation such as heavy fog, heavy rain, and heavy snow, it is difficult to secure visibility and driving safety, which may lead to car accident. In order to prevent such a situation, as a measure to secure a clear view of a driver, vehicle applicable technologies which expand a viewing angle of the driver using a wide angle camera or a multi camera or notify the driver of dangerous situations which occur during the driving using a lane or obstacle recognizing sensor have been suggested. However, the technologies still have a difficulty to secure the visibility in a situation of fog, heavy rain, or heavy snow.

As an example of a safety driving system, Korean Unexamined Patent Application Publication No. 10-2011-0008126 discloses "Safe driving assistant system which is optimized for climatic environment to secure a viewing angle of a driver to the maximum.

SUMMARY OF THE INVENTION

The present invention has been made in an effort to provide a vehicle control method for driving safety which photographs a visible ray and an infrared ray at a high speed to recognize a situation which has a difficulty to secure a clear view and turns on a fog lamp, limits a speed, and drives to actively avoid an obstacle and a device thereof.

An exemplary embodiment of the present invention provides a vehicle control method for driving safety, including: a first step of photographing an infrared image and a visible ray image; a second step of transmitting the photographed infrared image and visible ray image to an image recognizing and comparing module; a third step of obtaining frequency information for an edge from the infrared image and the visible image using a high pass filter, in the image recognizing and comparing module; and a fourth step of comparing a frequency band distribution processed in the third step to determine as a situation which has a difficulty to secure a clear view when a difference is equal to or higher than a predetermined level.

After the fourth step, the method may further include a fifth step of calculating a size of an obstacle in accordance with a speed using car speed information in an obstacle determining module, comparing the size of the obstacle with a size of the obstacle transmitted from the image recognizing and comparing module to determine a size of the obstacle for every speed and a position of the obstacle to transmit the determined information to an active obstacle avoiding module.

In the fifth step, the speed is classified into a low speed, an intermediate speed, and a high speed and the low speed is lower than 20 km/h, the intermediate speed is 20 km/h to 60 km/h, and the high speed is higher than 60 km/h.

The visible ray image and the infrared image may be photographed at a high speed of 60 fps or higher.

After the fifth step, the method may further include a sixth step of determining whether to stop the vehicle, reduce the speed, or avoid the obstacle using size information of the obstacle for every speed and position information.

After the sixth step, the method may further include a seventh step of transmitting a determined content to at least one of a driving device, a braking device, and a steering device.

Further, the infrared image and the visible ray image may be photographed by a plurality of cameras.

Triangulation may be performed using a phase difference of the infrared image and the visible ray image which are photographed by the plurality of cameras to measure a distance between the obstacle and the vehicle.

After recognizing the situation which has a difficulty to secure a clear view, in the infrared region, in order to recognize an object and measure a distance, three frame images of a visible ray/infrared ray, an infrared ray/infrared ray, and a visible ray/visible ray may be photographed by the plurality cameras.

In the third step, FFT may be performed on the infrared image and the visible ray image and then a high pass filter may be used.

The visible ray image and the infrared image may be photographed to recognize a situation which has a difficulty to secure a clear view and a fog lamp is turned on, the speed is limited, and an active obstacle is avoided.

An exemplary embodiment of the present invention provides a vehicle control device for driving safety, including: a photographing unit which photographs an infrared image and a visible ray image; and an image comparing and determining unit which obtains frequency information for an edge from the images photographed in the photographing unit, analyzes the frequency information and determines to be a situation which has a difficulty to secure a clear view when a frequency distribution difference between the infrared image and the visible ray image is larger than a predetermined level.

The image comparing and determining unit may include an obstacle determining module which calculates a size of an obstacle for every speed using vehicle speed information, compares the calculated size with a size of an obstacle transmitted from the image recognizing and comparing module to determine a size of the obstacle for every speed and a position of the obstacle to be transmitted to an active obstacle avoiding module.

Further, the vehicle control device may further include a vehicle control unit which determines whether to stop the vehicle, reduce the speed, or avoid the obstacle using the size of the obstacle for every speed and the position information which are transmitted from the image comparing and determining unit and controls at least one of a driving device, a braking device, and a steering device to actively avoid an obstacle.

According to the present invention, a vehicle control method for driving safety alternately photographs a visible ray and an infrared ray at a high speed to recognize a situation which has a difficulty to secure a clear view and turns on a fog lamp, limits a speed, and drives to actively avoid an obstacle.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
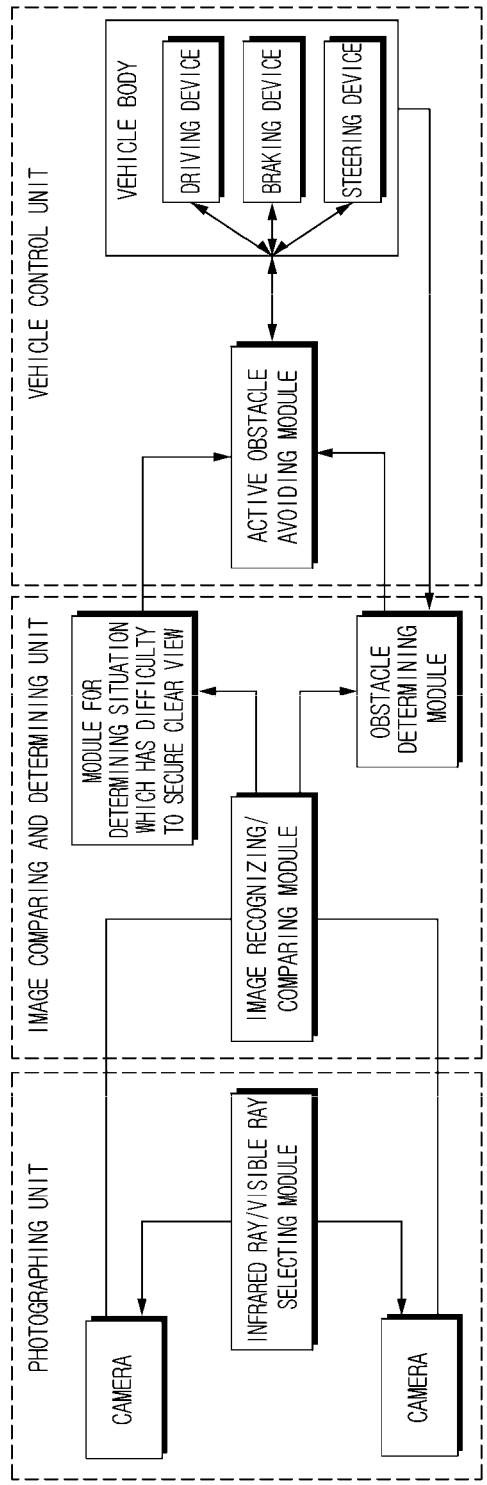
FIG. 1 is a block diagram of a vehicle control device for driving safety according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter, exemplary embodiments of the present invention will be described in detail with reference to the accompanying drawings. In the figures, it should be noted that even though the parts are illustrated in different drawings, it should be understood that like reference numerals refer to like parts of the present invention throughout the several figures of the drawing. Further, hereinafter, an exemplary embodiment of the present invention will be described, but it is obvious that the technical spirit of the present invention is not restricted or limited thereto, but the exemplary embodiment of the present invention may be modified by a person with ordinary skill in the art and may be variously carried out.

In a vehicle control method for driving safety according to an exemplary embodiment of the present invention, a visible ray and an infrared ray are alternately photographed to recognize a situation which has a difficulty to secure a clear view. When the situation which has a difficulty to secure a clear view is recognized it is possible to drive to actively avoid an a obstacle by automatically turning on a fog lamp, limiting a speed, and determining an obstacle in accordance with the vehicle speed and a size of a driving obstacle.

Here, when the visible ray and the infrared ray are alternately photographed at a high speed, a high speed photographing speed of the camera, that is, a frame per second is 60 fps. The frame per second (FPS) is a unit which indicates a speed at which a frame (screen) of a video or a film is switched in the unit of a second.

FIG. 1 is a block diagram of a vehicle control device for driving safety according to an exemplary embodiment of the present invention. As illustrated in FIG. 1, a vehicle control device for driving safety according to an exemplary embodiment of the present invention includes a photographing unit which selects and photographs an infrared image and a visible ray image, an image comparing and determining unit which recognizes and compares the photographed image to determine a clear view securing situation and presence of obstacle, and a vehicle control unit which controls the vehicle for driving safety in accordance with the determined content in the image comparing and determining unit.

Figure 2:
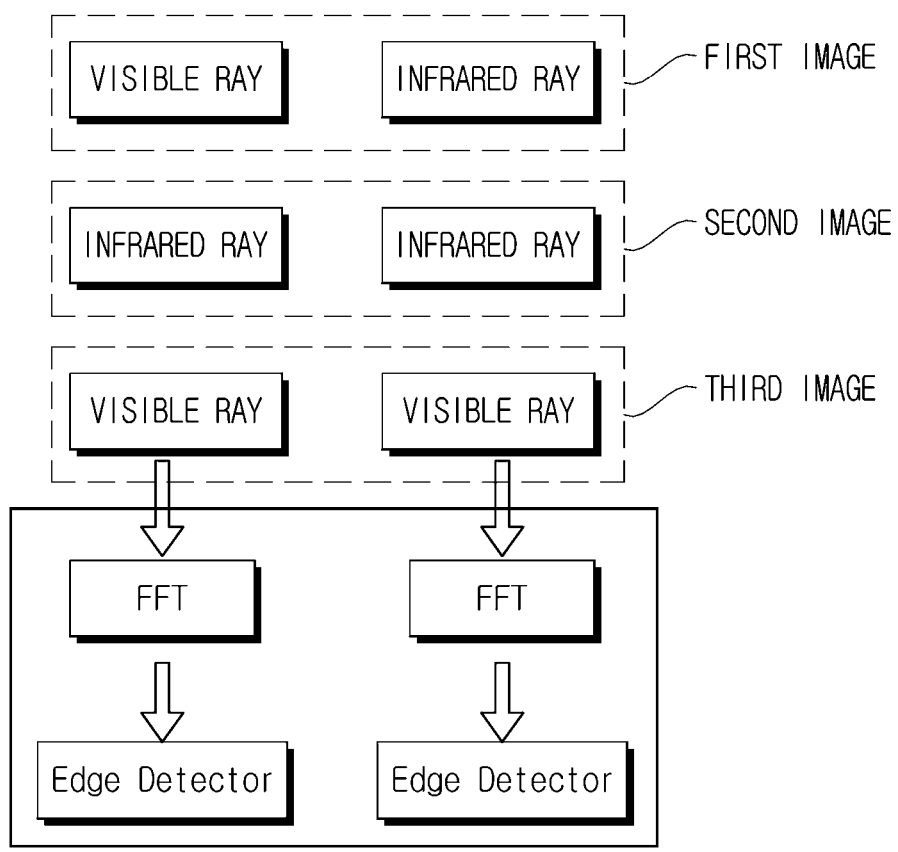
FIG. 2 is a block diagram of a visible ray image and infrared image obtaining process according to an exemplary embodiment of the present invention.

FIG. 2 is a block diagram of a visible ray image and infrared image obtaining process according to an exemplary embodiment of the present invention and includes a step of obtaining a frequency distribution of an edge by photographing three frame images such as a visible ray/infrared ray, an infrared ray/infrared ray, and a visible ray/visible ray.

Figure 3:
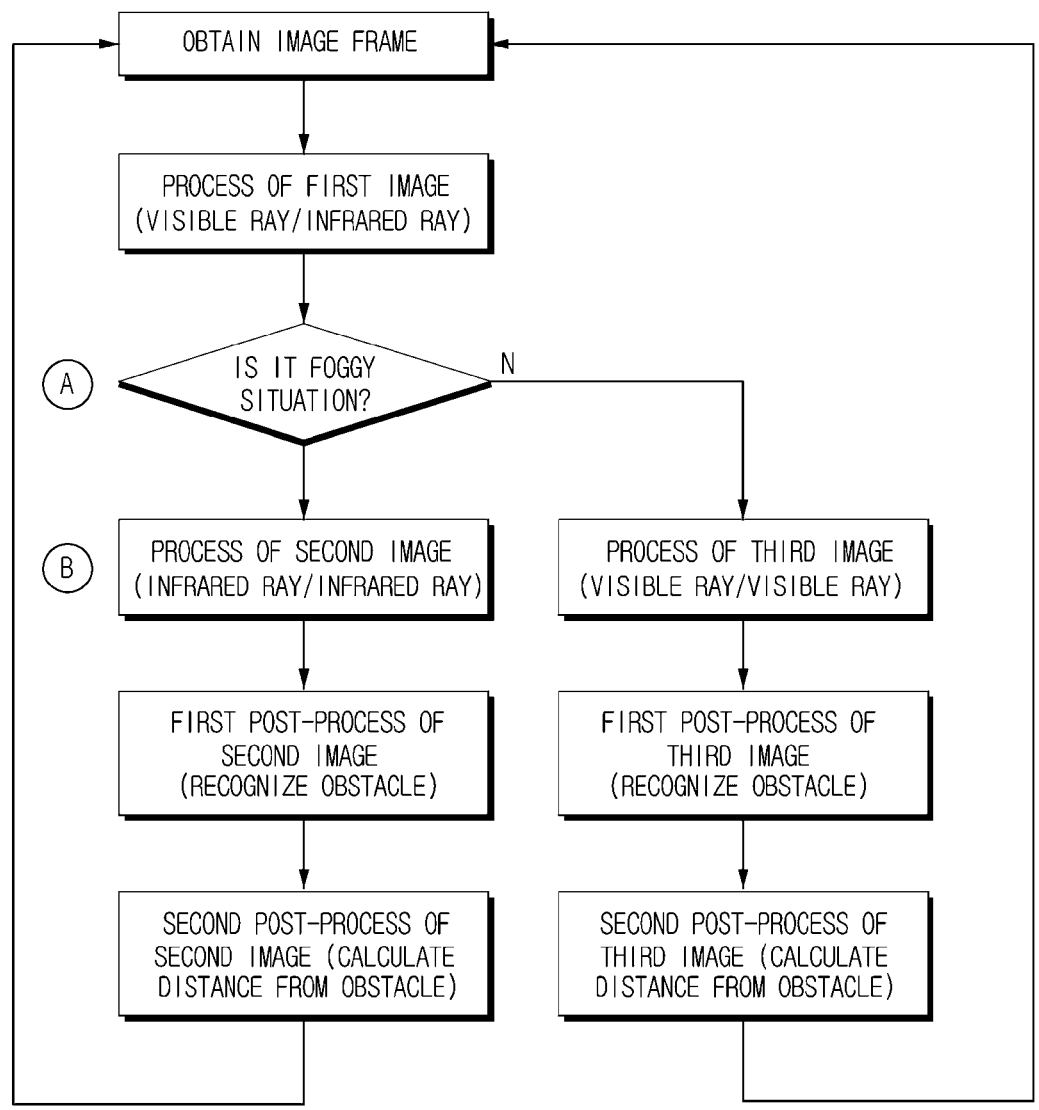
FIG. 3 is a flowchart of image processing according to an exemplary embodiment of the present invention.
Figure 4:
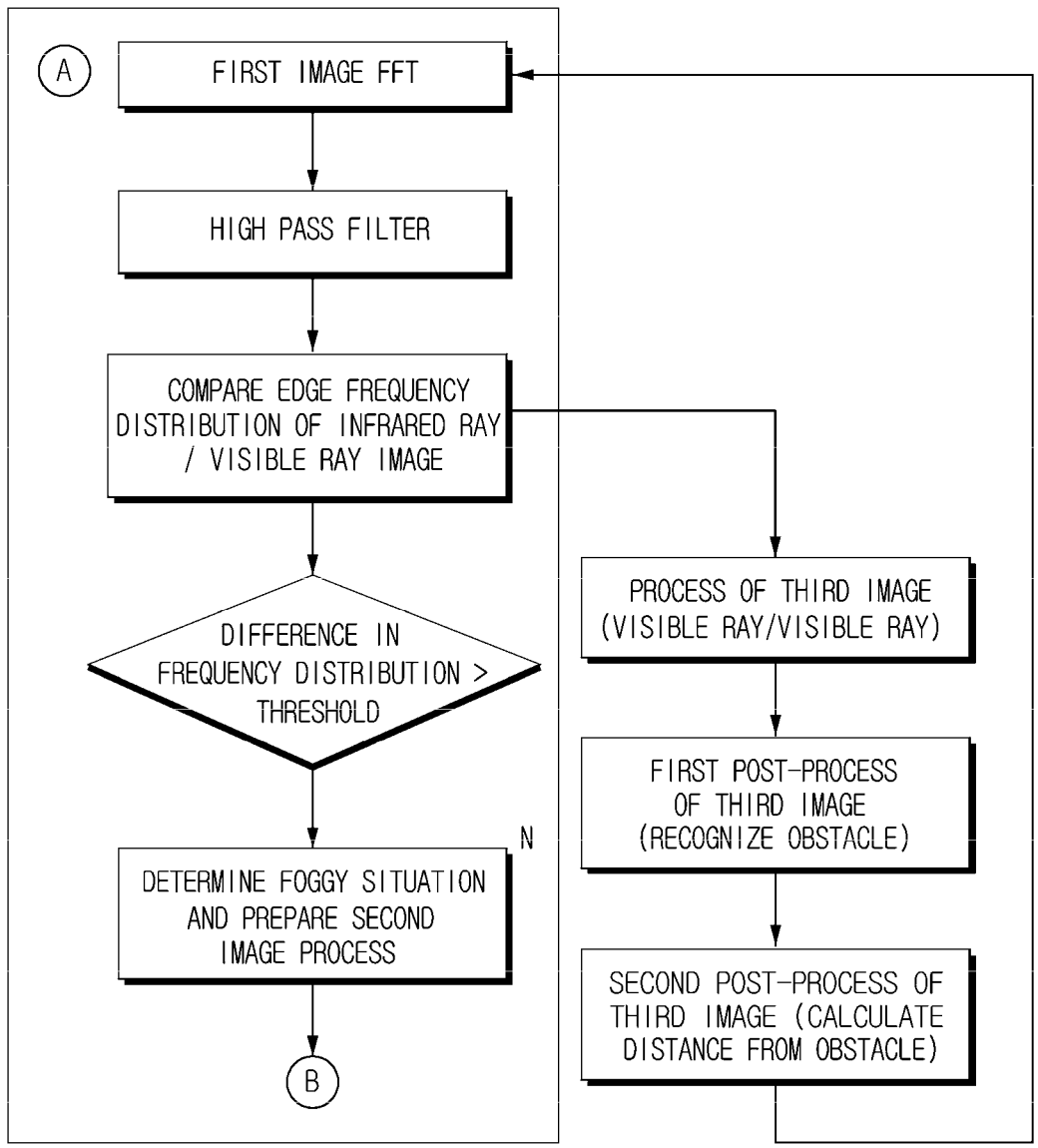
FIG. 4 is a flowchart of detecting a situation which has a difficult to secure a clear view according to an exemplary embodiment of the present invention.

FIG. 3 is a flowchart of image processing according to an exemplary embodiment of the present invention and FIG. 4 is a flowchart of detecting a situation which has a difficulty to secure a clear view according to an exemplary embodiment of the present invention. As illustrated in FIGS. 3 and 4, specifically, in the first step, an infrared image and a visible ray image are sequentially obtained from two or more cameras which may photograph infrared ray and visible ray images. A plurality of cameras simultaneously photographs images to measure a distance between an obstacle and the vehicle.

In the second step, which is next to the first step, the photographed infrared image and visible ray image are transmitted to the image recognizing and comparing module. In the case of a situation which has a difficult to secure a clear view, it is difficult to recognize an object, so that infrared photographing is performed.

In the third step, which is next to the second step, the photographed infrared image and visible ray image are transmitted to the image recognizing and comparing module and fast Fourier transform is subjected to the infrared image and the visible ray image. Thereafter, only frequency for an edge is left using a high pass filter.

In the fourth step, which is next to the third step, frequency band distributions which are processed in the third step are compared and when the difference is equal to or higher than a predetermined level, it is determined that the situation is a situation which has a difficult to secure a clear view.

In this case, when it is determined that the situation is a situation which has a difficult to secure a clear view, the method may further include a fifth step which calculates a size of an obstacle in accordance with a low speed (lower than 20 km/h), an intermediate speed (20 km/h to 60 km/h), and a high speed (higher than 60 km/h) using car speed information in an obstacle determining module, compares the size of the obstacle with a size of a target transmitted from the image recognizing and comparing module to determine a size of a target for every speed and a position of the obstacle and transmit the determined information to an active obstacle avoiding module.

After the fifth step, the method may further include a sixth step of receiving the size of the target for every speed and the position of the obstacle to determine whether to stop the vehicle, reduce a speed, or avoid the obstacle and transmit a command to at least one of a driving device, a braking device, and a steering device.

In the meantime, in order to measure a distance between the obstacle and the vehicle, triangulation is performed using a phase difference of images which are simultaneously photographed by the plurality of cameras. However, since it is difficult to recognize an object in a situation which has a difficult to secure a clear view, after detecting the fog, the object is recognized and a distance is measured in an infrared region. To this end, images formed of three frames of visible ray/infrared ray, infrared ray/infrared ray, and visible ray/visible ray are alternately photographed using two cameras.

In order to implement a vehicle control method for driving safety according to an exemplary embodiment of the present invention, a system including the plurality of cameras which may recognize an infrared ray and a visible ray, an image processing ECU which may process images photographed by the cameras, and a driving/braking/steering ECU may be configured in the vehicle. The image processing ECU controls to recognize a situation which has a difficult to secure a clear view, determine an obstacle, and drive to actively avoid an obstacle. The driving/braking/steering ECU is an electromagnetic braking and electric steering ECU. In the meantime, an infrared read image in the situation which has a difficult to secure a clear view may be output on a front glass of the vehicle. An active avoidance driving command may be issued through a communication channel. An example of the communication channel may be Ethernet. Ethernet is a representative local area network having a bus structure. After checking whether a communication network is being used by a computer which sends data, when the communication network is available (CSMA/CD (carrier sense multiple access with collision detection), the computer sends data. When the communication network is being used, checking is performed again after a predetermined time. Whether the communication is being used may be checked by an electrical signal.

In the meantime, the camera which is installed in the vehicle to recognize the infrared ray and the visible ray may be a broadband camera which may automatically track a motion of an object. The broadband camera has a pan-tilt-zoom function and rotates at 360° at high speed. The broadband camera may rotate up and down and left and right to photograph an image in an omnidirection and in a long distance at a wide angle and in a short distance in a zoom state.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A control method of a vehicle for driving safety, comprising:
   photographing a first frame image that includes a first infrared image and a first visible ray image;
   photographing a second frame image that includes a second infrared image and a third infrared image;
   photographing a third frame image that includes a second visible ray image and a third visible ray image;
   transmitting the photographed first infrared image and the photographed first visible ray image to an image recognizing and comparing module;
   obtaining frequency information for an edge from the first infrared image and the first visible ray image by processing the transmitted first infrared image and the transmitted first visible ray image using a high pass filter, in the image recognizing and comparing module;
   comparing a first frequency band distribution of the processed first infrared image and a second frequency band distribution of the processed first visible ray image to determine a situation in which securing a clear view is difficult when a difference between the first and second frequency band distributions is equal to or higher than a predetermined level;
   processing the second frame image when a situation associated with the first frame image is determined as the situation in which securing the clear view is difficult;
   processing the third frame image when the situation associated with the first frame image is not determined as the situation in which securing the clear view is difficult; and
   performing one or more vehicle control actions when the situation has been determined.

2. The method of claim 1, further comprising:
   after comparing the first and second frequency band distributions,
   calculating a size of an obstacle in accordance with a speed using car speed information in an obstacle determining module, comparing the size of the obstacle with a size of a target transmitted from the image recognizing and comparing module to determine a size of the target for every speed and a position of the obstacle, and transmitting the determined information to an active obstacle avoiding module.

3. The method of claim 2, wherein in calculating the size of the obstacle in accordance with the speed, the speed is classified into a low speed, an intermediate speed, and a high speed, and
   wherein the low speed is lower than 20 km/h, the intermediate speed is 20 km/h to 60 km/h, and the high speed is higher than 60 km/h.

4. The method of claim 1, wherein the first visible ray image and the first infrared image are photographed at a speed of 60 fps or higher.

5. The method of claim 2, further comprising:
   after transmitting the determined information,
   receiving the size of the target for every speed and the position of the obstacle to determine whether to stop the vehicle or avoid the obstacle.

6. The method of claim 5, further comprising:
   after receiving the size of the target for every speed and the position of the obstacle,
   transmitting a determined content to one or more of a driving device, a braking device, and a steering device.

7. The method of claim 1, wherein the first infrared image and the first visible ray image are photographed by a plurality of cameras.

8. The method of claim 7, wherein triangulation is performed using a phase difference of the photographed first infrared image and the photographed first visible ray image to measure a distance between the obstacle and the vehicle.

9. The method of claim 8, wherein before determining the situation, the first, second, and third frame images are photographed by the plurality cameras in order to recognize an object and measure a distance in an infrared region.

10. The method of claim 1, wherein in processing the transmitted first infrared image and the transmitted first visible ray image, a fast Fourier transform (FFT) is performed on the first infrared image and the first visible ray image and then the high pass filter is used.

11. The method of claim 1, wherein, when the one or more vehicle control actions include any of turning on a fog lamp, limiting the speed of the vehicle, and actively avoiding an obstacle.

* * * * *